Sept. 11, 1923.
C. J. W. HAYES
1,467,478
METALLIC VEHICLE WHEEL
Filed Sept. 2, 1920
3 Sheets-Sheet 1
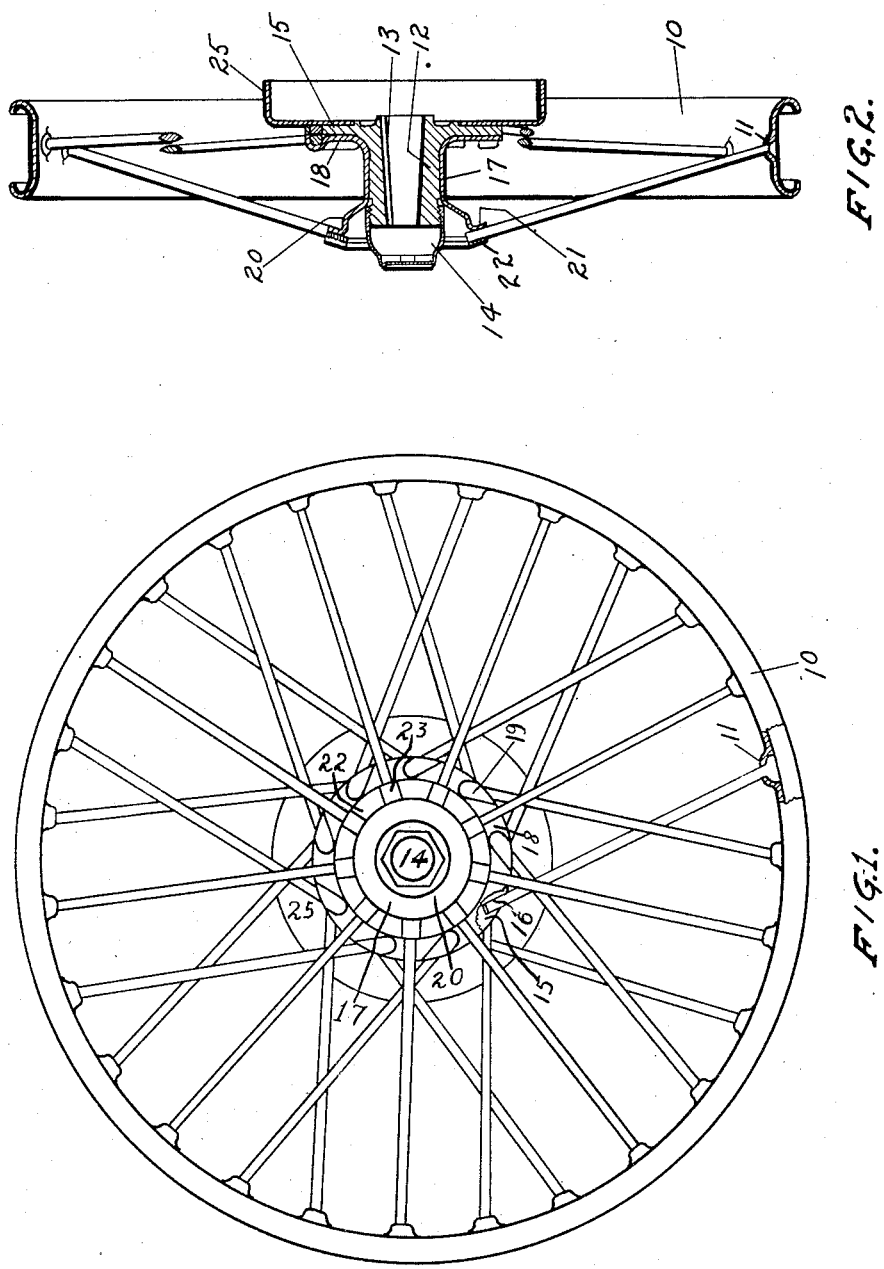

Sept. 11, 1923.  1,467,478
C. J. W. HAYES
METALLIC VEHICLE WHEEL
Filed Sept. 2, 1920   3 Sheets-Sheet 2
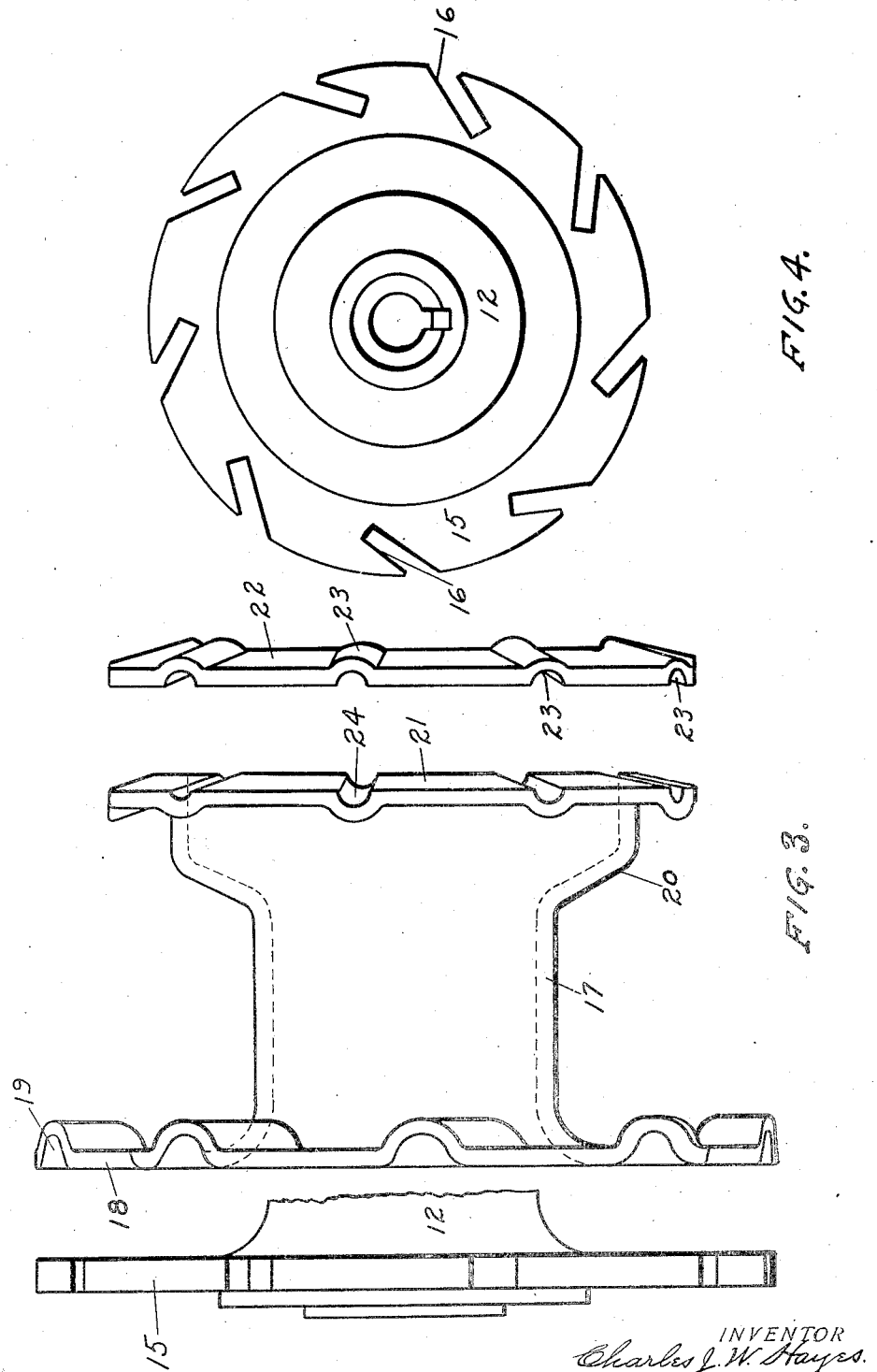

Sept. 11, 1923.
C. J. W. HAYES
1,467,478
METALLIC VEHICLE WHEEL
Filed Sept. 2, 1920
3 Sheets-Sheet 3
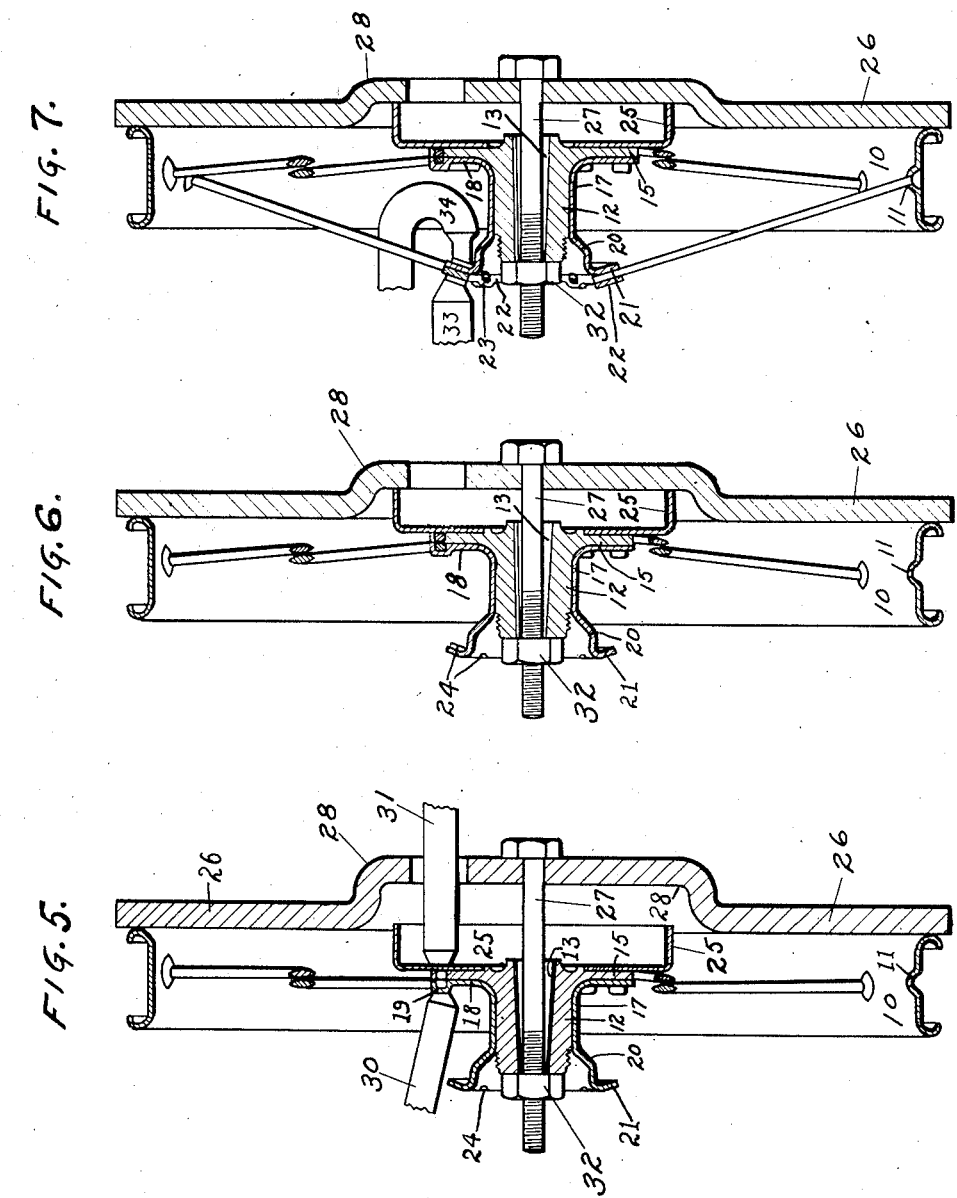
WITNESS:
INVENTOR.
Charles J. W. Hayes.
BY
ATTORNEY.

Patented Sept. 11, 1923.

1,467,478

UNITED STATES PATENT OFFICE.

CHARLES J. W. HAYES, OF ROCHESTER, MICHIGAN, ASSIGNOR TO FORD MOTOR COMPANY, OF DETROIT, MICHIGAN, A CORPORATION OF DELAWARE.

METALLIC VEHICLE WHEEL.

Application filed September 2, 1920. Serial No. 407,647.

*To all whom it may concern:*

Be it known that I, CHARLES J. W. HAYES, a citizen of the United States of America, residing at Rochester, county of Oakland, State of Michigan, have invented new and useful Improvements in a Metallic Vehicle Wheel, of which the following is a specification.

The object of my invention is to provide an improved metallic vehicle wheel of simple, durable, and inexpensive construction.

A further object of my invention is to provide a metallic vehicle wheel of the type which carries the load by the tension on the spokes as distinguished from those which carry the load largely by the compression on the spokes.

A further object of my invention is to provide such a wheel having tension spokes and means for welding the spokes in place in the wheel which will permit the spokes to be placed under tension.

A further object of my invention is to provide an improved hub construction especially adapted for a welded type of metallic wheel and, in combination with this structure, means for securing the brake housing through the wheel.

A further object of my invention is to provide improved means for centering the hub within the rim and to provide a method of welding spokes to the rim.

With these and other objects in view, my invention consists in the arrangement, combination and construction of the various parts of my improved device, as described in the specification, claimed in my claims, and shown in the accompanying drawings in which—

Figure 1 shows a side elevation of a wheel embodying my invention,

Figure 2 is a vertical central sectional view through the wheel shown in Figure 1.

Figure 3 shows an elevation of the hub members detached from the wheel and in position for assembly.

Figure 4 shows a top or plan view of one of the hub members, and

Figures 5, 6, and 7 show sectional views through the wheel and assembly jig and illustrate the manner of asembly.

Referring to the acompanying drawings, I have used reference numeral 10 to indicate a metallic vehicle wheel rim of ordinary construction which, in this instance, is illustrated as being a channel-shaped rim adapted to receive a pneumatic tire. It will be understood, however, that I may use, in connection with my invention, any sheet metal ring used as a felloe or rim in connection with such a wheel. The rim 10 is provided at intervals with a plurality of regularly spaced cup shaped sockets 11 which have an opening through their bottom portions designed to slidably receive a spoke. In order to fasten a spoke to the rim the spoke is inserted into the cup member in position where its end will lie within the cup and a pellet such, for instance, as a disk of metal, is placed in the cup adjacent to the end of the spoke. The pellet and end of the spoke are then welded so that they fuse with the cup shaped portion of the rim and with each other, and so that the outer surface of the portion so fused will be substantially flush with the outer surface of the rim. This welding may be accomplished by applying split electrodes to opposite sides of the spoke, these electrodes being provided with recesses adapted to receive the inner surface of the cup 11, so that when the second electrode is applied to the pellet and end of the spoke then the spoke, pellet and cup material will be welded or fused into one piece.

It is also possible to fasten the spokes to the rim by providing an enlargement at the end of the spoke similar in shape to the cup 11, then applying a split electrode, as described, to this cup shaped portion and applying the second electrode to the exterior surface of the rim to fuse the end of the cup shaped portion into the material of the rim.

In the practice of my invention I have welded the spokes to the rim, as heretofore described, prior to their attachment to the hub member. In the form of my invention here shown I have used a cylindrical hub member 12 having a tapered opening 13 therein designed to be fixed to and to receive the end of the axle shaft. The axle shaft may be locked into this hub member in any suitable manner and a hub cap 14 provided to close the end thereof. At the inner end of the hub member 12 an outwardly extending flange 15 is provided which has a plurality of spoke receiving recesses 16, as shown in Figure 4, formed in its periphery by making angular cuts in the periphery through the flange which are substantially equal in width to the width of the spokes to be used. The axes of these recesses form an angle with radial lines relative to the center of the hub and also form a somewhat less angle with adjacent tangent lines.

Mounted on the hub member 12 is a hollow cylindrical shell 17 which terminates at one end in a flange 18. This flange 18 has upset portions 19 therein which form open sided recesses designed to receive the ends of a set of spokes. The axes of these recesses cross the axes of the recesses 16 and form a similar angle with radial and tangential lines relative to the flange 15. It will be seen, therefore, that the recesses 16 and 19 are adapted to receive the ends of oppositely extending sets of tangential spokes to thereby combine a maximum efficiency in a driving connection between the hub and rim, with a maximum supporting efficiency.

The end of the shell 17 opposite the flange 18 is provided with a bell shaped enlarged portion 20 which receives the hub cap 14 and terminates in a comparatively narrow outwardly extending flange 21. This flange 21 has a plurality of semi-cylindrical radially disposed recesses 24 therein adapted to form parts of sockets for the ends of spokes, and a ring 22 has substantially the proportions and shape of the flange 21 and is provided with a plurality of complementary semi-cylindrical recesses 23 adapted to complete corresponding recesses 24 in the flange 21, to thereby form cylindrical spoke receiving sockets. These sockets formed by the recesses 23 and 24, are disposed with their axes substantially parallel with radial lines from the axis of the wheel and are inclined away from a plane perpendicular to the axis of the wheel. A brake drum 25 of ordinary construction may be used in connection with my improved hub construction, if so desired.

In assembling the hub members and spokes I place the rim 10 against the platform 26 in position with its center coinciding with the bolt 27 which passes through the platform 26. This bolt passes through the hub member 12 whereby the latter may also be centered with the bolt 27, thereby insuring that the hub and rim will be concentric when assembled. The platform 26 is provided with a dished portion 28 adjacent to the bolt 27 for a purpose which will hereinafter be made clear.

In the assembly of a wheel where a brake drum is to be used, the latter is first slid down over the bolt 27 and then the hub member 12 may be slid down over the bolt after which the proper spokes of the wheel may be set into the recesses 16 of the flange 15. The shell 17 may then be slid down over the hub member 12 and the proper spokes centered within the recesses 19 of the flange 18. Due to the strength of the spokes and the fact that they are welded to the rim 10, the spokes will support the parts in position with the spokes mentioned, lying in a plane substantially perpendicular to the axis of the wheel. When in this position electrodes 30 and 31 of a welding device may be brought into position against the central portion of a recess 19 and a corresponding portion of the inner surface of the brake housing. Due to the crossing of the sockets 19 and 16, the action of the electrodes will cause the two spokes intersecting between the electrodes, the flange 18, the flange 15, and the brake housing to be simultaneously welded together. The electrodes may then be moved around to the next pair of sockets to similarly weld the spokes and flanges, or the wheel structure may be rotated sufficiently to bring the next pair of spokes into position to be operated upon by the electrodes where a similar platform is used to that shown in the drawings. When all of the pairs of spokes in the flanges 18 and 15 have been welded to thereby unify the structure of the flanges 18 and 15, the corresponding spokes and the brake housing, it would be seen that all of the spokes co-acting with these flanges will lay in a plane substantially perpendicular to the axis of the wheel but will not be under tension. The recesses in the flanges are made large enough to receive the spokes loosely enough to take care of slight variations in the length of the spokes.

When the spokes have been welded to the flanges 15 and 18, as described, then the nut 32 on the bolt 27 is rotated to draw the hub structure together with the brake housing down into the recesses 28. This operation draws the spokes into position where they form a slight angle with a perpendicular plane as is illustrated in Figure 6. The free ends of the spokes adapted to co-act with the flange 21 having been placed in the recesses 24, the ring 22 is placed over the flange 21 with the recesses 23 co-acting with the spokes and the recesses 24, to form cylindrical sockets for the corresponding spokes. Electrodes 33 and 34 may be then brought into contact successively with the sockets so formed, as is illustrated in Figure 7, to thereby unify the structure of the flange 21, the ring 22 and the corresponding spokes. If now the nut 32 be unscrewed the tension on the spokes connected to the flanges 15 and 18 will be relaxed somewhat and translated correspondingly into a tension on the spokes connected with the flange 21. As the hub structure is exactly centered with the rim this translation or equalization of tension on the spokes will place all of the spokes on the wheel under substantially the same tension.

By the foregoing description it will be seen that I have secured all the advantages of a unified structure resulting from welding, while at the same time utilizing the well known advantages resulting from the use of spokes which transfer the weight from the hub to the rim by the tension on the spokes.

Where no brake housing is used in connection with the wheel, as is the case with the ordinary front wheels of vehicles, then the spokes are welded to the flange 15 by placing a pellet of metal above the spoke and recess 16 at the time the electrodes are brought together so that the fusing of the pellet may furnish sufficient additional material to permit the surface of the recess, after welding, to be substantially flush with the surface of the flange 15.

By the use of my improved vehicle wheel I am enabled to carry a portion of the weight and substantially all of the torque due to driving the wheel or braking the wheel, by the spokes connected to the flanges 15 and 18. Inward thrusts against the rim or outward thrusts by the axle are largely resisted by the tension on the spokes connected with the flange 21. By my improved method of welding I am enabled to secure the advantages of a welded wheel combined with a wheel carrying weight and torque, by the tension on the spokes. By my improved hub construction I am enabled to secure a maximum strength with a minimum amount of material, and in addition thereto to secure an ease of assembly. Other obvious advantages also result from the use of my improved structure.

Some changes may be made in the arrangement and construction of the various parts of my improved device without departing from the spirit of the invention therein, and it is my intention to cover by my claims such changes as may be reasonably included within the scope thereof.

I claim as my invention:

1. In a metallic vehicle wheel, a rim, a hub having spaced flanges thereon, a set of spokes extended from each of the flanges to the rim, said spokes having their ends fused into the material of the rim and flanges.

2. A vehicle wheel having metallic rim, spoke, and hub elements, fused at their places of connection, the parts being so arranged that the spokes are under tension and are arranged in sets which lie in surfaces of cones forming an angle with each other.

3. A metallic vehicle wheel having a rim, a hub member comprising a shell having spaced flanges thereon, a rim, and spokes extended between each of the flanges and the rim, said spokes being under tension and being welded to both the rim and the flanges.

4. A method of forming a metallic vehicle wheel having a set of spokes extending from either end of the hub to the rim consisting of first welding one set of spokes in place, then displacing the hub along an axial line to place the spokes under tension, and then welding the second set of spokes in place.

5. A method of forming a metallic vehicle wheel having a set of spokes extending from either end of the hub to the rim consisting of first welding one set of spokes in place, then displacing the hub along an axial line to place the spokes under tension, then welding the second set of spokes in place, and then releasing the hub to permit the tension on the first set of spokes to co-act to place both sets of spokes under tension.

6. A metallic vehicle wheel having a cylindrical hub shell having flanges at its ends, and rings adapted to co-act with each of said flanges, said rings and flanges having registering semi-cylindrical recesses formed therein adapted to form sockets for the ends of the spokes whereby the spokes may be made integral with the hub by applying welding electrodes to opposite sides of the sockets formed by the rings and flanges.

7. A metallic wheel having a cylindrical hub shell, an annular flange at one end thereof having spoke receiving sockets formed therein, said sockets having their axes disposed at an angle to radial lines from the axis of the shell, and a second flange contiguous with the first flange, said second flange having spoke receiving sockets therein each of which has its axis crossing the axis of one of the first mentioned set of sockets whereby the electrodes of a welder may be applied to opposite sides of each pair of sockets to simultaneously weld in two spokes.

8. A metallic wheel having a substantially cylindrical hub member, an annular flange at one end thereof having spoke receiving sockets formed therein, a substantially cylindrical shell adapted to be mounted on the hub member, annular flanges at the ends thereof having spoke receiving sockets therein, one of said flanges being disposed contiguous to the flange on the hub member and having the axes of certain of its sockets crossing the axis of certain of the axes of the sockets in the hub member flange, a ring adapted to co-act with the second flange on the shell to form closure members for the sockets thereof, and spokes adapted to be received within the sockets whereby the spokes in the hub flange and adjacent shell flange may be simultaneously welded in pairs, and the welding of spokes to the second shell flange may simultaneously weld the ring in place.

9. The method of forming a wheel consisting of welding one end of the spokes to the rim, then forming a hub with sockets therein adapted to loosely receive the spokes, then setting the spokes in said sockets and centering the hub with the rim, and then welding the spokes in place in said sockets.

10. The method of forming a metallic wheel consisting of welding one end of the spokes to the rim, forming a hub with axially spaced sets of sockets adapted to loosely receive the other ends of the spokes, placing the other ends of the spokes in the sockets, centering the hub, welding the spokes so placed into one set of the sockets, then displacing the hub axially to place the welded spokes under tension, welding the spokes into the second set of sockets, and then releasing the displacing pressure on the hub to equalize the tension on the two sets of spokes.

11. The method of joining a round spoke to a hub consisting of forming a recess in the hub having one side open to permit the spoke to enter it laterally, then placing the spoke in the recess, then placing a metallic pellet over the spoke and recess, and then welding the pellet and spoke into the recess whereby the open side of the recess may be filled to substantial alignment with the surface of the hub.

12. The method of forming a metallic wheel consisting of forming a cup shaped recess in the rim having an opening in the bottom thereof to receive the spoke, inserting the spoke to position where its end lies within the recess, placing a metallic pellet adjacent to the end of the spoke, and then welding the spoke, material of the recess, and pellet to unite them and to form a substantially flush outer surface on the rim.

Date: August 31, 1920.

CHARLES J. W. HAYES.

Witness:
E. L. DAVIS.